(12) United States Patent
Colorado (10) Patent No.: US 7,016,701 B2
(45) Date of Patent: Mar. 21, 2006

(54) APPARATUS FOR DISPLAYING AN ILLUMINATION PATTERN AND METHOD THEREOF

(75) Inventor: Rafael Colorado, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 171 days.

(21) Appl. No.: 10/329,091

(22) Filed: Dec. 23, 2002

(65) Prior Publication Data

US 2004/0204014 A1 Oct. 14, 2004

(51) Int. Cl.
H04Q 7/20 (2006.01)

(52) U.S. Cl. .................. 455/550.1; 455/567; 455/90.1
(58) Field of Classification Search ............ 455/550.1, 455/575.1, 90.1, 90.2, 90.3, 566, 567; 379/376.01
See application file for complete search history.

(56) References Cited

U.S. PATENT DOCUMENTS

| | | | |
|---|---|---|---|
| 5,087,906 A | | 2/1992 | Eaton et al. |
| 5,946,636 A | * | 8/1999 | Uyeno et al. ............... 455/566 |
| 6,035,180 A | * | 3/2000 | Kubes et al. ............ 455/575.1 |
| 6,418,323 B1 | * | 7/2002 | Bright et al. ............ 455/550.1 |
| 6,720,863 B1 | * | 4/2004 | Hull et al. ................. 340/7.51 |

OTHER PUBLICATIONS

Motorola V66 Phone for T-Mobile http://commerce.motorola.com/cgi-bin/ncommerce3/ProductDisplay?.
Motorola Intechangeable Bezels Vale Pack—98378 http://commerce.motorola.com/cgi-bin/ncommerce3/ProductDisplay?.
Mobile Phone GSM/SGH-R210 http://www.samsungelectronics.com/mobile_phone/wireless_terminals.
Nokia 8290 Phone http://www.nokiausa.com/phones/8290.
Nokia 8290 Phone Covers http://www.nokiausa.com/phones/8290/1,5258,colors:1,00.html.

* cited by examiner

Primary Examiner—Erika A. Gray
(74) Attorney, Agent, or Firm—Vedder, Price, Kaufman & Kammholz, P.C.

(57) ABSTRACT

An apparatus and method for displaying an illumination pattern includes a plurality of illumination regions (222, 224, 226 and 228), wherein each of the plurality of illumination regions (222–228), are capable of illuminating in one or more of a variety of colors and for a prescribed time period, frequency. The method and apparatus further includes a processor (102) coupled to each of the illumination regions (222–228), such that the processor may execute an illumination pattern (108) in response to an activation command. The illumination pattern (108) provides for the selective activation and deactivation of at least one illumination region (222–228) through an illumination signal (110, 112), such that the display of the illumination pattern provides for a further level of personalization for the apparatus (100).

26 Claims, 7 Drawing Sheets

APPARATUS FOR DISPLAYING AN ILLUMINATION PATTERN AND METHOD THEREOF

BACKGROUND OF THE INVENTION

The invention relates generally to a portable electronic device and more specifically to the personalization of the electronic device through the visual display of an illumination pattern and the ability to use illumination patterns as content.

With the growth of portable devices, such as wired or wireless devices, such as a cellular phone, a personal digital assistant, a smart phone, a laptop computer, a desktop computer, or any other suitable device for providing electronic user interaction, there is a concurrent growth to provide for the personalization of these portable devices. For example, in cellular telephone technology, while there exists a trend for improved power consumption, improved communication capabilities and other electronic features, there is also a growing trend to allow a user to personalize his or her particular phone.

One common approach to personalization of a portable device is providing interchangeable covers, or faceplates. For example, the Nokia 8290 cellular phone available from Nokia, Inc., provides the user the ability to place different faceplates having different colors or patterns on the phone. Thereupon, the user may personalize his or her cellular phone based on the chosen faceplate. Other physical distinctions are also available, such as the Motorola V.66 cellular phone available from Motorola, Inc., which allows for interchangeable face clips on the top portion of the flip-phone.

Another common approach to personalization are ring tones audibly displayed by the phone to notify an incoming signal, such as a incoming call, a voicemail message or any other type of notification. Current trends for portable devices include abilities to interact with messaging systems, such as a Short Messaging System (SMS), an Extended Messaging System (EMS), and a Multi-media Messaging System (MMS). Currently, many portable devices provide the user with an internal library of available ring tones. The user may selectively associate specific ring tones with specific incoming signals to provide differentiation. Moreover, a user may associate a specific ring tone with a particular caller identifier. Furthermore, there exists the commercial opportunity for the user to purchase selective ring tones from commercial internet-based websites, wherein the ring tones may then be seamlessly downloaded to the phone for the user's enjoyment. Also, some portable devices also provide for a composer, allowing a user to compose a personalized ring tone consisting of selected tones.

An emerging area of personalization in portables devices is the selective illumination of an illumination region, such as one or more light emitting diodes (LEDs), a backlight, a light channel as described in U.S. Pat. No. 5,087,906, or any other suitable illumination display as recognized by one having ordinary skill in the art, visible on the surface of the portable device. For example, the Samsung R210 available from Samsung, Inc. provides for a single LED disposed on the front surface, wherein the single LED illuminates the single color red to signify an incoming signal, such as an incoming call. Another example is the Motorola C300 cellular phone, available from Motorola, Inc., which provides for an illuminating keypad that lights up in a single color when the phone is activated. Yet another example are commercially available Nokia compliant faceplates that have multiple LEDs that flash in a non-sequential manner. Furthermore, there also exists antennas having one or more LEDs disposed within or on top of the antenna for providing illumination in response to the transmission of information using the antenna.

As such, regarding selective illumination of portable devices, there currently exists either random LED illuminations disposed about the portable device, timed LED(s) that activate in a single color and at a set pattern in response to an incoming or outgoing signal, or the general illumination of region of the portable device in a predefined color.

BRIEF DESCRIPTION OF THE DRAWINGS

The embodiments for a method and apparatus for displaying an illumination pattern will be more readily understood with reference to the following drawings, wherein.

DETAILED DESCRIPTION OF THE INVENTION

Generally, an apparatus and method for displaying an illumination pattern includes a processor operably coupled to a plurality of illumination regions, wherein an illumination region includes any area on the apparatus capable of being illuminated. The processor executes an illumination pattern, in response to an activation command, wherein an illumination pattern includes one or more commands provided to the processor for the selective activation and de-activation of one or more of the illumination regions. The activation command is any type of pre-programmed activity performed by the apparatus, such as, but not limited to, activating an alarm.

Figure 1:
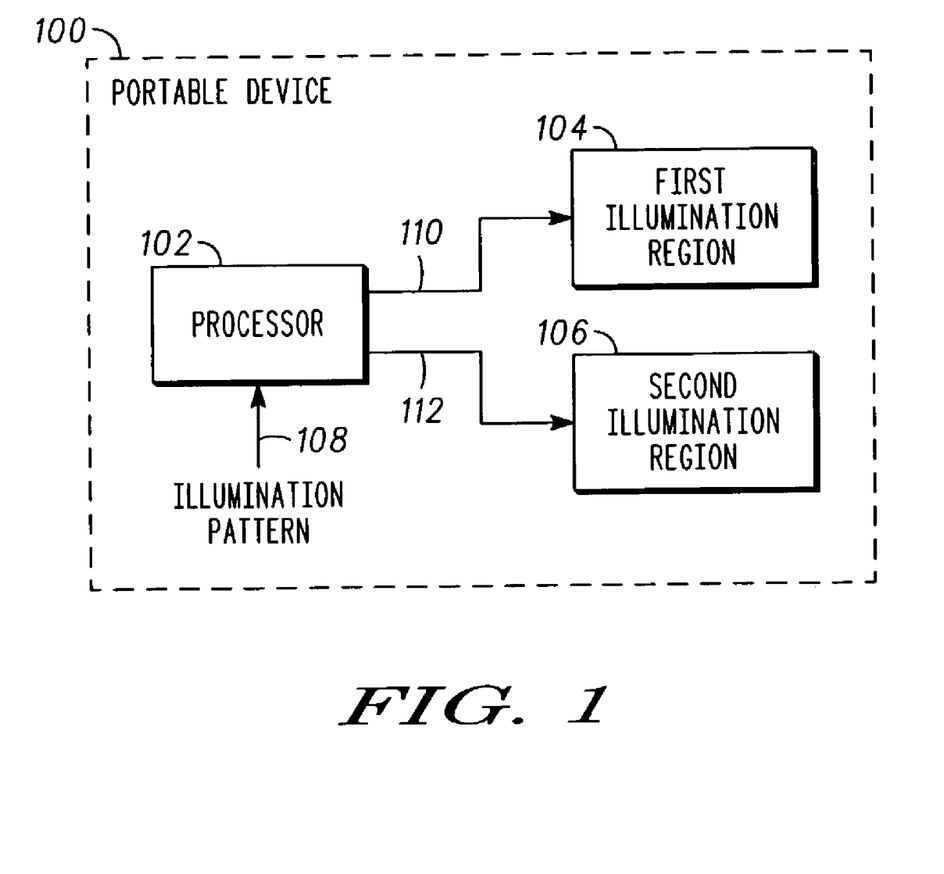
FIG. 1 illustrates an example of a portable device capable of displaying an illumination pattern.

More specifically, FIG. 1 illustrates a portable device 100 that contains a processor 102, a first illumination region 104 and a second illumination region 106. The processor 102 receives an illumination pattern 108, which may be provided from, among other locations, a memory (not shown) or another processor (not shown). The processor 102 may be, but not limited to, a single processor, a plurality of processors, a DSP, a microprocessor, an ASIC, a state machine, or any other implementation capable of processing and executing software or discrete logic or any suitable combination of hardware, software and/or firmware. The term processor should not be construed to refer exclusively to hardware capable of executing software and may implicitly include DSP hardware, ROM for storing software, RAM, and any other volatile or non-volatile storage medium.

In one embodiment, the illumination pattern includes an initialization tag and one or more illuminating tags having at least three elements, a first element directed to which particular region(s) is (are) to be illuminated, the second element being the color for the illuminated region, and the third element being a timing or frequency indicator for the duration of the illumination. Furthermore, the illumination pattern may be provided from an illumination composer, as discussed in co-pending Patent Application entitled, METHTOD AND APPARATUS FOR COMPOSING AN ILLUMINATION PATTERN, having a filing date of Dec. 23, 2004, and Ser. No. 10/329,089.

The processor 102, in response to the illumination pattern 108, provides a first illumination signal 110 to the first illumination region 104 and/or a second illumination signal 112 to the second illumination region 106. The illumination signals 110, 112 include power to activate the illumination region 104, 106 and further contain power to provide for a selected color for the illumination region 110, 112. In another embodiment, the illumination signal 110 or 112 may contain color and frequency information to be received by the illumination region, which may thereupon generate the prescribed color and illuminate for the prescribed time interval. The processor 102, in response to the illumination pattern 108, provides the illumination signals 110, 112 for a specified frequency, thereupon activating the illumination region (104, 106) and thus de-activating the illumination region (104, 106) at the prescribed frequency.

Figure 2:
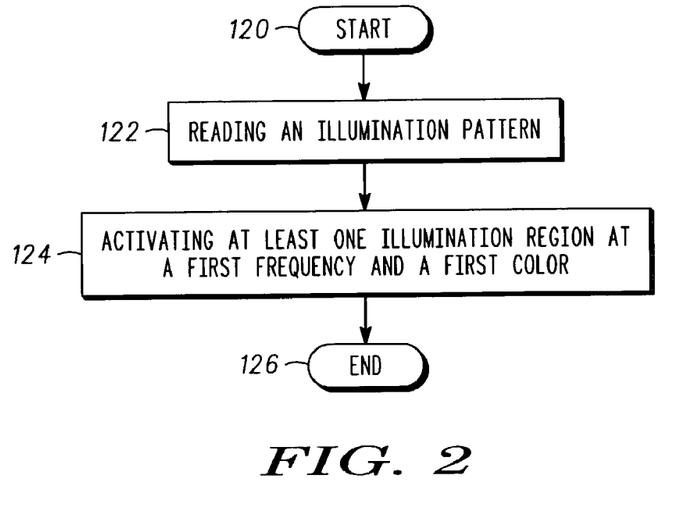
FIG. 2 illustrates an example of a method for displaying an illumination pattern.

FIG. 2 illustrates the steps of a method for displaying an illumination pattern, such as illumination pattern 108 of FIG. 1. The method begins, step 120, by reading an illumination pattern, step 122. As discussed above with respect to FIG. 1, the illumination pattern 108 is received by the processor 102, whereupon the processor reads the encoded illumination pattern. The next step of the method for displaying the illumination pattern, step 124, is activating one or more illumination regions for a first frequency and at a first color. Once again, with respect to FIG. 1, at least one of the two illumination regions 104, 106 are activated by an illumination signal 110 or 112, which is provided for a prescribed period and contains power signals directed to activating a specified color. Thereupon, the method for displaying an illumination pattern is complete, step 126.

Figure 3:
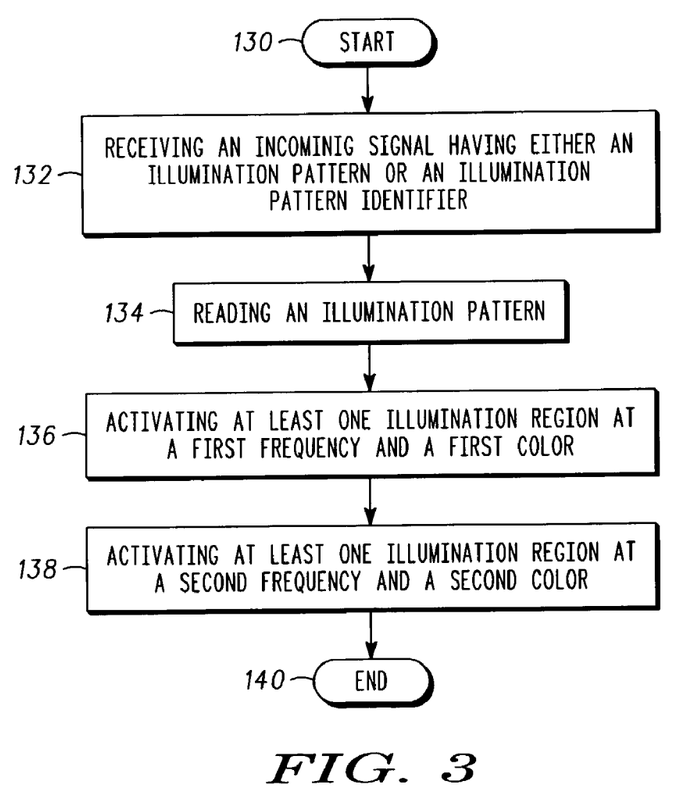
FIG. 3 illustrates another example of a method for displaying an illumination pattern.

FIG. 3 illustrates the steps of another method for displaying an illumination pattern. The method begins, step 130, by receiving an incoming signal having either an illumination pattern or an illumination pattern identifier, step 132. The incoming signal may be a SMS message, an EMS message, a MMS, a caller identification, a voice mail notification, an alarm, or any other signal provided to or generated by a portable device, as recognized by one having ordinary skill in the art. In one embodiment, if an illumination pattern is received, for example as an attachment to a message, the illumination pattern may be extracted from the message and separately provided to the processor 102. In the embodiment wherein the incoming signal includes an illumination pattern identifier, the identifier may be provided to a reference or look-up table, whereupon the illumination pattern identified by the illumination pattern identifier may be retrieved, such as from a memory location, and thereupon provided to the processor 102.

Regardless thereof, the next step of the method is reading the illumination pattern, step 134. In one embodiment, the illumination pattern 108 is read by the processor 102. In response to the illumination pattern 108, the next step is activating at least one illumination region at a first frequency and at a first color, step 136. As discussed above with respect to FIG. 1, the processor 102 provides the illumination signal 110 and/or 112 to the illumination region 104 and/or 106. The method further includes activating a second selected illumination region, such as 110 and/or 112 at a second prescribed color and a second prescribed time interval, step 138. Once the illumination pattern 108 has been executed by the processor 102, the method is complete, step 140.

Figure 4:
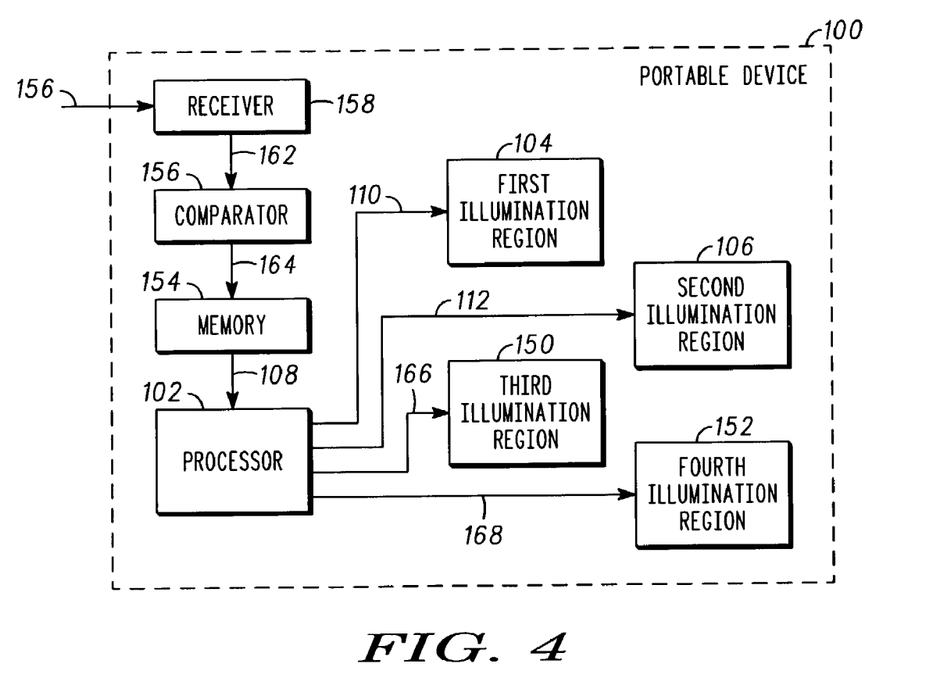
FIG. 4 illustrates another example of a portable device capable of displaying an illumination pattern.

FIG. 4 illustrates another embodiment of the portable device 100, the processor 102 operably coupled to the first illumination region 104, the second illumination region 106, a third illumination region 150 and a fourth illumination region 152. The processor 102 receives the illumination pattern 108 from a memory 154, wherein the memory 152 may be, but not limited to, a single memory, a plurality of memory locations, shared memory, CD, DVD, ROM, RAM, EEPROM, optical storage, or any other non-volatile storage medium capable of storing digital data. The memory is operably coupled to a comparator 156, which is coupled to a receiver 158. The receiver 158 may be any type of implementation capable of receiving an input signal 160 and thereupon providing an incoming signal 162 to the comparator 156. The comparator 156, implemented either in hardware or software, compares an illumination pattern identifier disposed within the incoming signal 162 and generates an illumination request signal 164 which is provided to the memory 154. The memory 154, provides the selected illumination pattern 108 to the processor which may thereupon execute the illumination pattern 108 itself. The processor 102 may provide the activation signal 110 to the first illumination region 104, the second activation signal 112 to the second illumination region 106, the third activation signal 166 to the third illumination region 105 and a fourth activation signal 168 to the fourth illumination region 152. As discussed above with regards to FIGS. 2 and 3, the processor 102 selectively activates and deactivates at least one chosen illumination region, 104, 106, 150 and 152, and continues to activate and deactivate regions until the illumination pattern 108 has been fully executed.

In accordance with one embodiment, the processor 102 provides the activation signals 110, 112, 166 and 168, in response to the illumination pattern 108. The processor 102 provides a power signal capable of causing the selected illumination region to be illuminated at a particular color, for example, when the illumination region is a LED, the processor 102 provides a red power supply, a green power supply, and a blue power supply wherein the combination of the three power supplies combine to form the selected color. In this embodiment, the processor 102 further provides the power to the illumination region for the prescribed period of time in relation to the predetermined frequency. For example, if the illumination pattern 108 calls for the first illumination region 104 and the third illumination region 150 to be illuminated at a color green for an interval of 0.5 seconds, the processor 102 provides an illumination signal 110 and 166 having the power commands to generate a green display, in accordance with known LED or other illumination techniques, and the power supply is provided such that the illumination of the first illumination region 104 and the third illumination region 150 occur for the half second interval.

Figure 5:
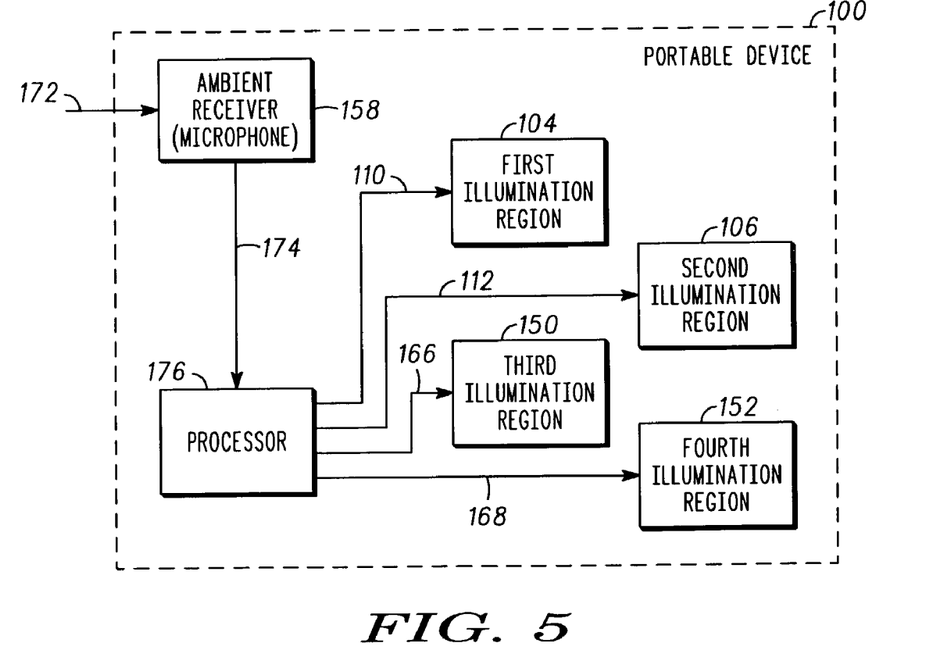
FIG. 5 illustrates another example of the portable device capable of displaying an illumination pattern.

FIG. 5 illustrates embodiment of the portable device 100 capable of operating in an ambient mode. The portable device 100 includes an ambient receiver 170, such as a microphone, that receives an ambient noise 172. The ambient noise 172 may be provided from any environment noise, such as within a loud club or other location playing music having a beat and a tempo. The ambient receiver 170 provides an ambient noise signal 174 to a processor 176 which is operably coupled to the first illumination region 104, the second illumination region 106, the third illumination region 150 and the fourth illumination region 152. The processor 176 may be, but not limited to, a single processor, a plurality of processors, a DSP, a microprocessor, an ASIC, a state machine, or any other implementation capable of processing and executing software or discrete logic or any suitable combination of hardware, software and/or firmware. The term processor should not be construed to refer exclusively to hardware capable of executing software and may implicitly include DSP hardware, ROM for storing software, RAM, and any other volatile or non-volatile storage medium.

The processor 176 may, in response to the ambient noise signal 174, selectively activate and deactivate different illumination regions based upon the beat and tempo of the ambient noise 172. The processor 176 may randomly generate activation signals 110, 112, 166 and/or 168 for the selective activation and/or deactivation of the specific regions in accordance with the beat and tempo of the ambient noise 172.

The processor 176 may have a preselected color designation or may randomly choose different colors for the different illumination regions, wherein the frequency for the illumination of each selected illumination region(s) is dictated by the beat and tempo of the ambient noise 172.

Figure 6:
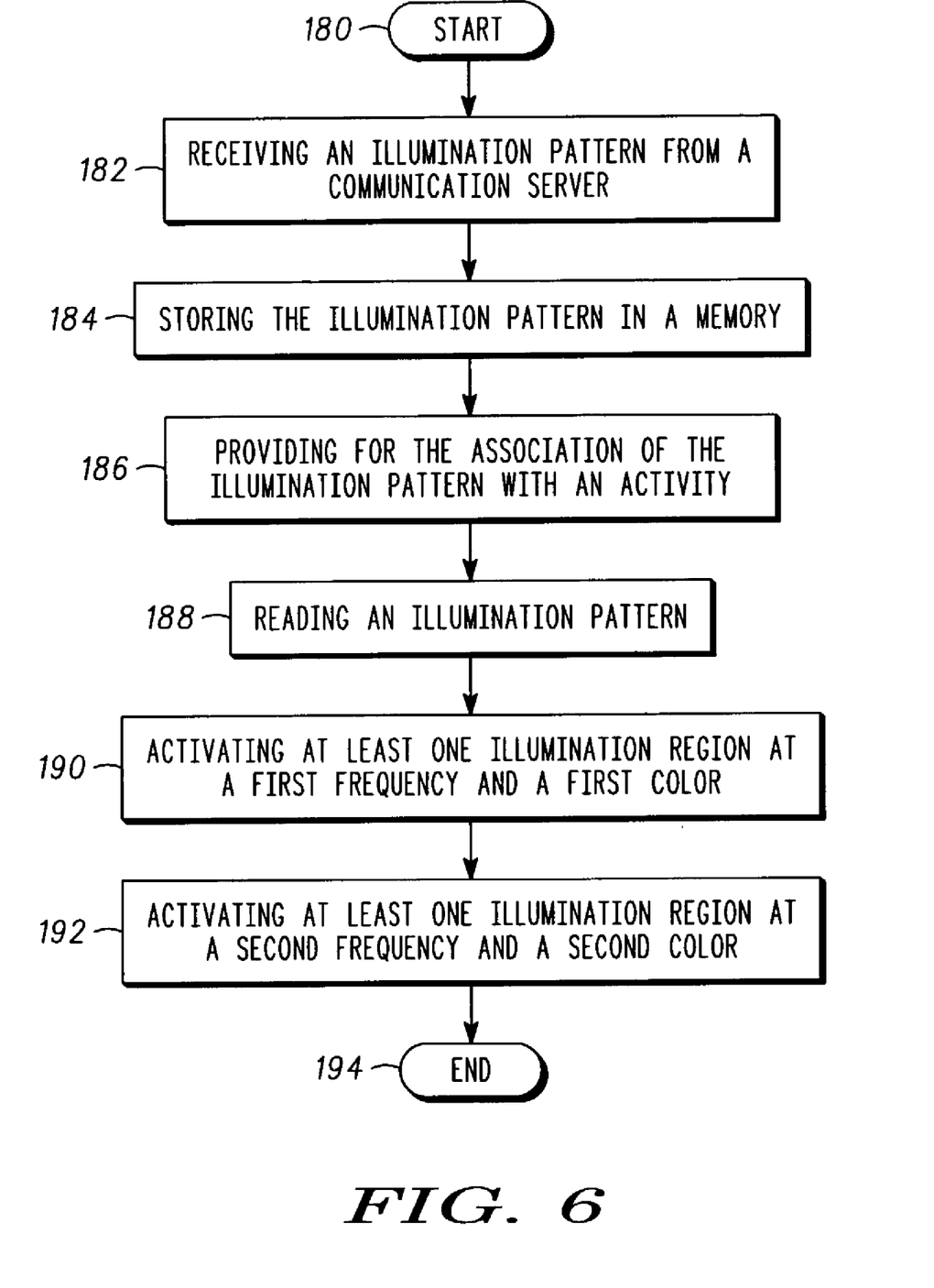
FIG. 6 illustrates another example of a method for displaying an illumination pattern.

FIG. 6 illustrates the steps of an alternative method for displaying an illumination pattern. The method begins, step 180, by receiving an illumination pattern from a communication server, step 182. In one embodiment, the communication server is a commercially available website, a proprietary network or any other centrally located communication device capable of providing an illumination pattern. In one embodiment, if the communication server is a central communication server such as a proprietary website through a specific Universal Resource Locator (URL), a user may log onto the website via the Internet and select an illumination pattern to be provided to the portable device. In one embodiment, if the portable device is a wireless device, the illumination pattern may be provided via communication transmission or if the portable device is a wired or non-communication device, the illumination pattern may be provided through a central location, such as an e-mail address, whereupon once the portable device is in communication with the central server, the illumination pattern may be specifically provided thereto.

The next step of the method includes storing the illumination pattern in the memory, step 184. For example, FIG. 4 illustrates the memory 154, whereupon the illumination pattern displayed therein, in conjunction with one or more illumination patterns for the presentation of the illumination pattern memory. Next, step 186, the method includes providing for the association of the illumination pattern with an activity. In one embodiment, this may be accomplished through the activation of a user interface via a menu or other interactive device whereupon, through a user interface, the user may selectively associate the illumination pattern with a specific activity. For example, the user may select a selected illumination pattern to be associated with a specific caller identification or in another example, when a message is received from a particular sender.

The next step is reading the illumination pattern, 188. As discussed above, the processor 102 may read the illumination pattern and thereupon selectively activate at least one illumination region at a first frequency and at a first color, step 290. Furthermore, in accordance with the illumination pattern, the processor 102 may further activate at least one illumination region for a second frequency and at a second color, step 192. Once all of the commands within the illumination pattern 108 have been executed, the method is complete, step 194.

Figure 7:
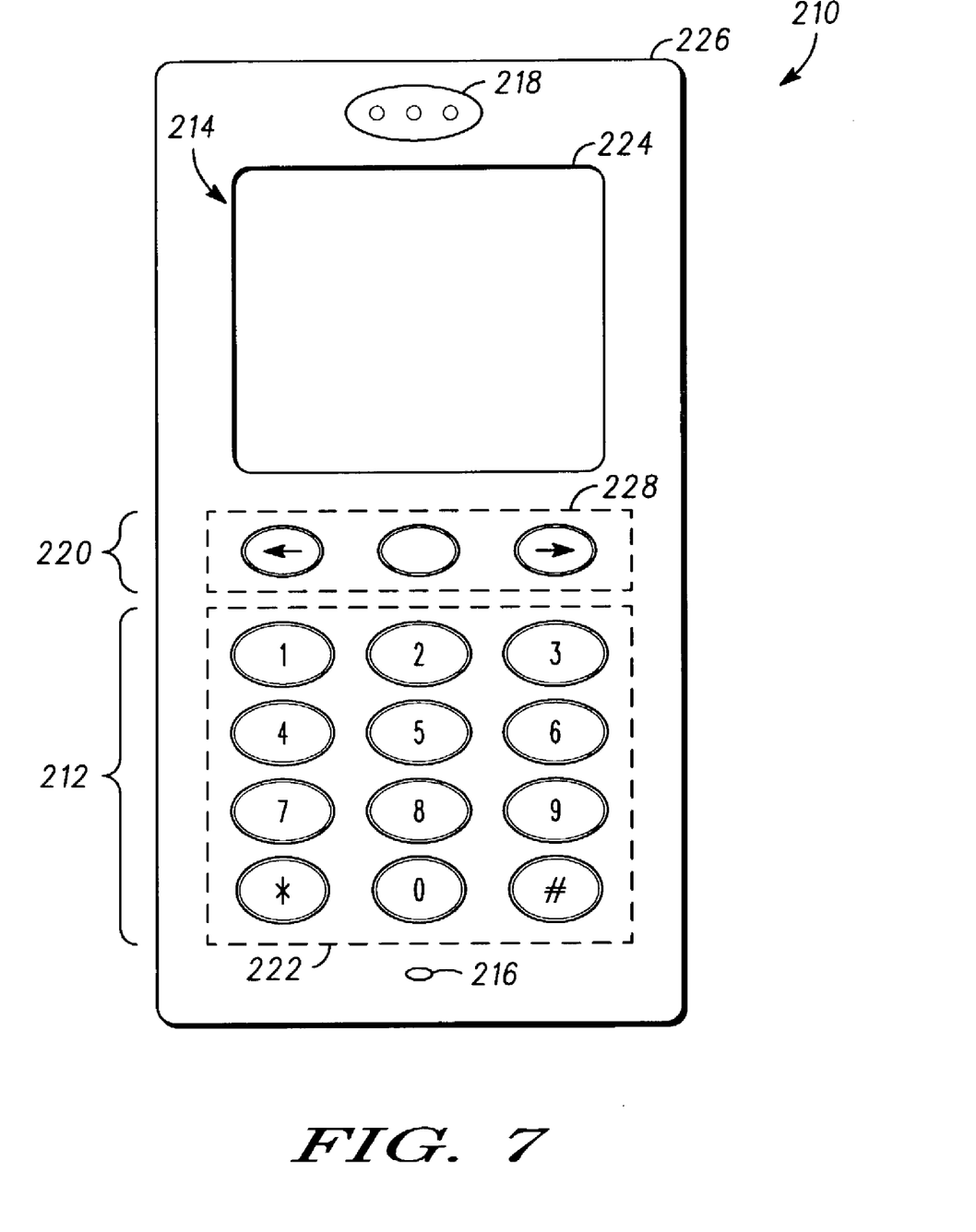
FIG. 7 illustrates another embodiment of the portable device capable of displaying an illumination pattern.

FIG. 7 illustrates an example of a portable device 210 having a number keypad 212, a display screen 214, voice receiver 216, a speaker 218 and a navigational pad 220. With reference to FIG. 3, the portable device 210 may include the user interface 102 being the number keypad 212, the voice receiver 216 or the navigational pad 220 and the display device 140 being either the monitor 214 or the speaker 218. Not visible, the telephone 210 includes a processor, similar to processor 104, capable of receiving input signals, such as 108, and thereupon composing an illumination pattern.

The portable device 210 further includes four illumination regions, a keypad region 222, a display region 224, a perimeter region 226 and a navigation button region 228. As recognized by one having ordinary skill in the art, the portable device 210 may include further illumination regions, such as sub-regions within the designated regions, for example a pattern of keypad buttons. In one embodiment, each keypad button may be designated as a separate illumination region, or a plurality of buttons may be grouped together, to be considered a specific illumination region.

When activated, the various illuminations regions, such as 220–226, may be selectively activated and de-activated for a prescribed period of time and activated at a prescribed color. The portable device 210 may provide for the display of illumination patterns through the reading of the illumination pattern and executing the illumination pattern (108) by a processor (not shown) disposed therein.

Figure 8:
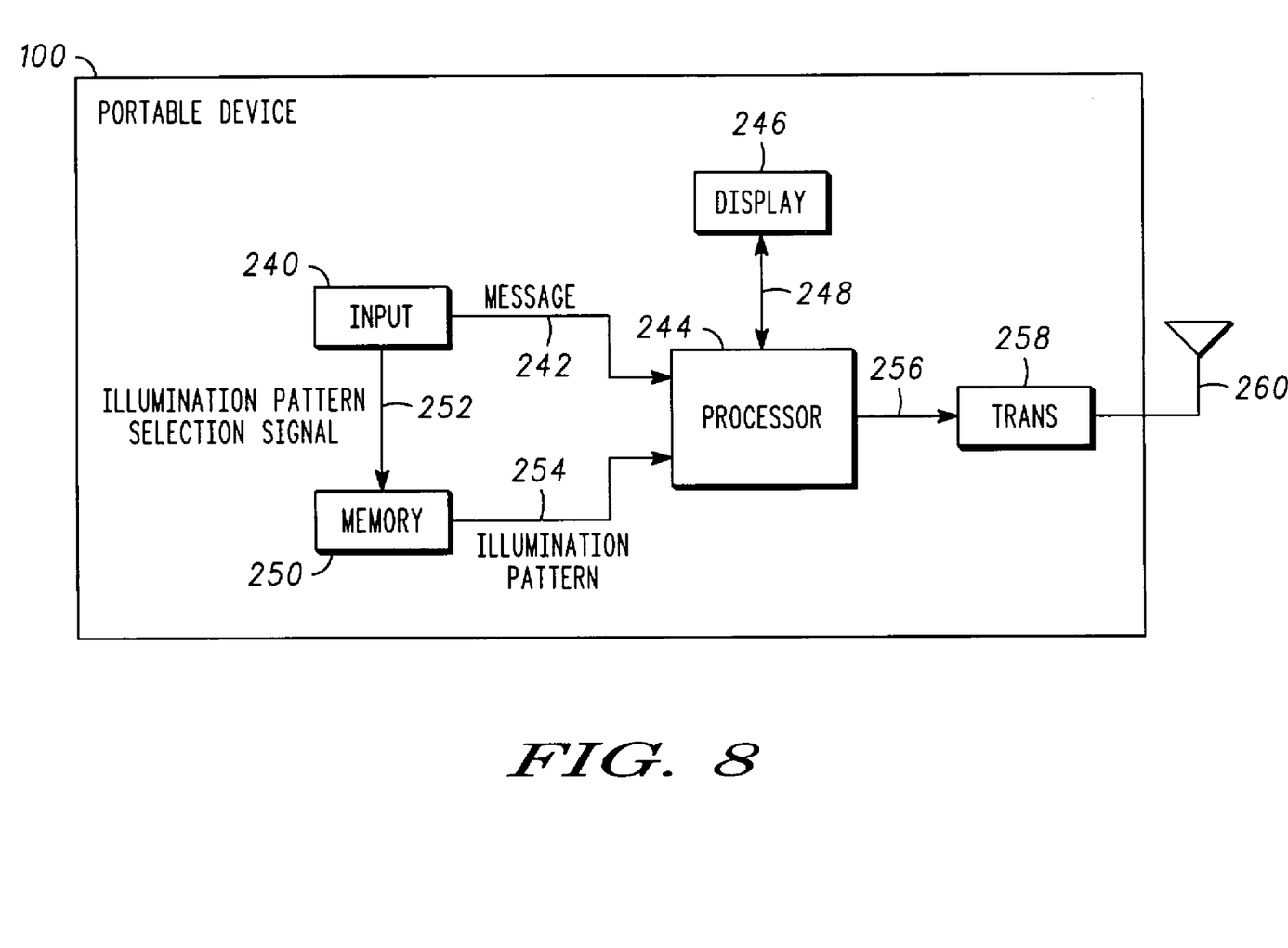
FIG. 8 illustrates another embodiment of the portable device capable of displaying an illumination pattern.

As illustrated in FIG. 8, in accordance with another embodiment, the portable device 100 may be utilized to incorporate the illumination patterns, as discussed above, as content in a messaging system. In one embodiment, the portable device 100 includes an input device 240, which may be a keypad, a keyboard, an electronic writing device, a speaker, or any other suitable device capable of receiving an input signal.

The input device 240 receives one or more input signals to generate an electronic message 242. As recognized by one having ordinary skill, in some electronic messaging systems, shorthand or slang using various letters, numbers and characters are used, so the electronic message may be a single input or a combination of input signals to create the electronic message 242. The electronic message 242 is thereupon provided to a processor 244, such as processor 102.

The processor 244 is further operably coupled to a display 246, such that the processor 244 provides a display signal 248 to the display 246 for a visual feedback from an end user operating the portable device 100, entering the electronic message 242 using the input device 240. The input device 240 is further operably coupled to a memory 250, wherein the memory 250 may store one or more illumination patterns, wherein the memory is similar to memory 154.

The end user may enter an illumination pattern selection signal 252 via the input device 240, which is provided to the memory 250. The memory 250 thereupon provides an illumination pattern 254, corresponding to the illumination pattern selection signal 252, to the processor 244. As recognized by one having ordinary skill in the art, the illumination pattern may be an illumination pattern source code, a universal resource locator, an illumination pattern identifier and any other suitable representation to indicate or signify a selected illumination pattern. The universal resource locator may be indication of a particular location of the illumination pattern, such as being stored on a service provider server (not shown). Furthermore, the illumination pattern may be stored locally on the portable device 100 or may be stored external to the portable device 100.

The processor 244, in one embodiment, thereupon associates the illumination pattern 254 with the electronic message 242 to generate a combined message and illumination pattern signal 256. This signal 256 is thereupon provided to a transmitter 258 whereupon it may be transmitted to a recipient device (not shown) via an antenna 260. In one embodiment, the recipient device may be similar to the device illustrated in FIG. 4, whereupon the illumination pattern may be extracted and executed, thereupon displaying the illumination pattern.

Figure 9:
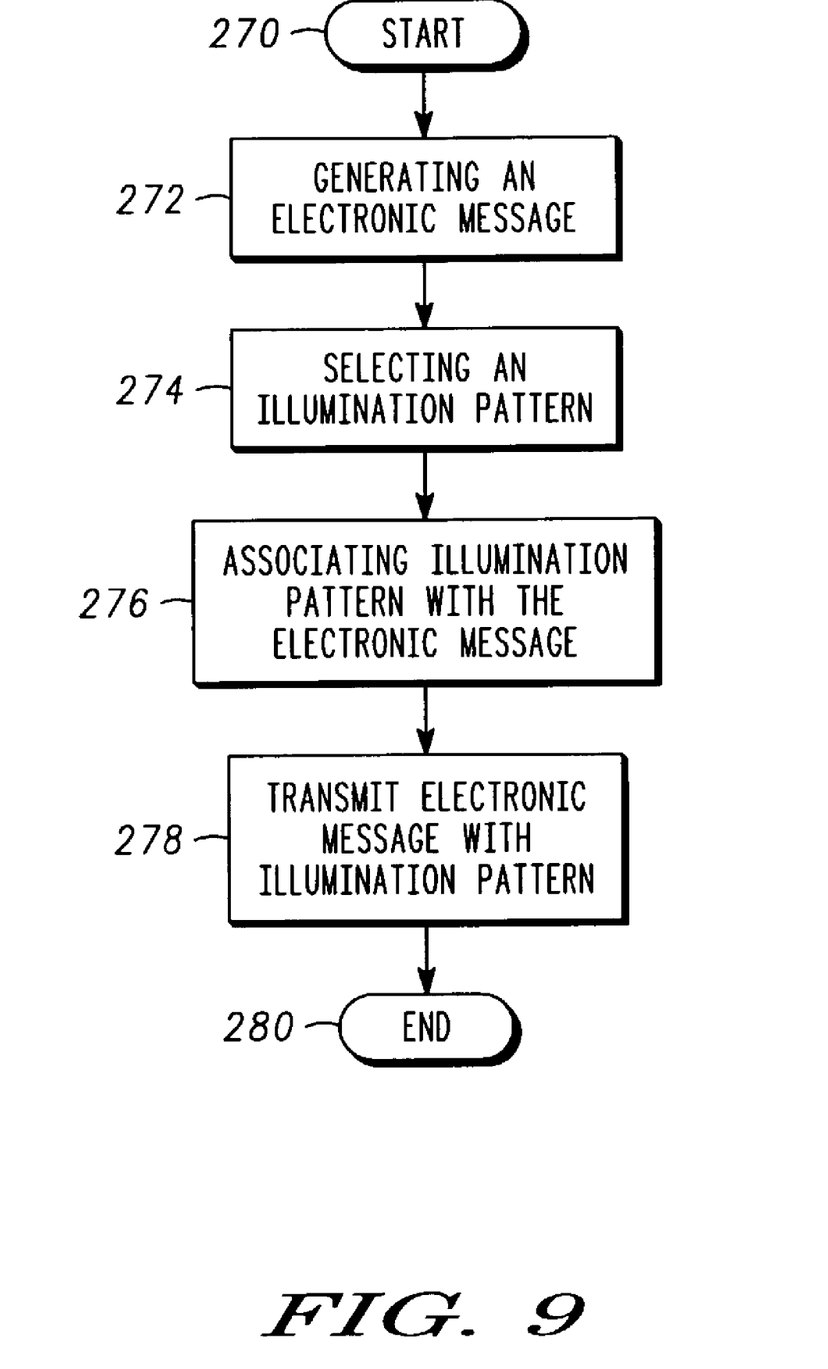
FIG. 9 illustrates a method for associating an illumination pattern with an electronic message.

FIG. 9 illustrates steps of one embodiment of a method for associating an illumination pattern with an electronic message. The method begins, step 270, by generating an electronic message 272. As discussed above, this electronic message 242 may be generated using the input 240.

The next step, step 274, includes selecting an illumination pattern. Once again, with reference to FIG. 8, the illumination pattern 254 is provided from the memory 250. The method includes associating the illumination pattern with the electronic message, step 276. Thereupon, the electronic message is transmitted to a recipient device, step 278 and the method is complete 280.

As discussed above, in one embodiment, the transmission of the electronic message and illumination pattern 254 may be within a messaging system. Among other available systems, the portable device 100 may operate using the SMS, EMS or MMS. Furthermore, from the perspective of the portable device 100, the portable device may receive a first input signal, such as illumination pattern selection signal 252, to select the illumination pattern, and may also receive a second input signal (not shown) to select a recipient device, such as another portable device reference by, for exemplary purposes only, a specific address or telephone number. Moreover, the portable device 100 may receive a message input signal, such as message signal 242, in the input device 240 to generate the electronic message to be associated with illumination pattern 254.

In one embodiment, the illumination pattern 254 may be transmitted without the electronic message 242, wherein the illumination pattern 254 represents the contents of the transmission. In this embodiment, the illumination pattern may be utilized to represent or convey an emotion based on the colors and other factors of the illumination pattern.

Thereupon, the portable device may be selectively personalized utilizing illumination patterns. The specific patterns may be further personalized to specific activities performed by the portable device and further may provide for the display of a higher level of interactivity through illumination patterns and color coordination, such as sending a message with an appropriate color illumination pattern, for example, red for Valentine's Day, green for St. Patrick's day.

It should be understood that there exists other implementations of other variations and modifications of the invention and its various aspects, as may be readily apparent of those of ordinary skill in the art, and that the invention is not limited by the specific embodiment described herein. For example, a portable device may contain any number of illumination regions, wherein each region may be centrally controlled by a main processor or each region may further contain a dedicated processor for the selective activation and de-activation of the lighting source to provide illumination. It is therefore contemplated and covered by the present invention, any and all modifications, variations or equivalents that fall within the spirit and the scope of the basic underlying principles disclosed and claimed herein.

What is claimed is:

1. A portable device comprising:
   a plurality of illumination regions; and
   a processor operably coupled to each of the plurality of illumination regions, the processor capable of executing an illumination pattern in response to a portable device activity, wherein the illumination pattern includes the selective activation and deactivation according to illumination timing of the plurality of illumination regions.

2. The portable device of claim 1 wherein the plurality of illumination regions includes a display region, a perimeter region, a keypad region and a navigation region.

3. The portable device of claim 1 wherein at least one of the illumination regions includes at least one of: one or more light emitting diodes and a light channel.

4. The portable device of claim 1 wherein the plurality of illumination regions provide the ability to illuminate in more than one color.

5. The portable device of claim 1 wherein the plurality of illumination regions are capable of being illuminated at various frequencies.

6. The portable device of claim 1 further comprising:
   a comparator capable of comparing a type of activation command with a database of illumination patterns and providing for the processor to activate a selected illumination pattern in response to the type of activation command.

7. The portable device of claim 1 further comprising:
   an ambient noise receiver capable of receiving ambient noise having a distinct rhythm includes a beat and tempo such that the processor generates an ambient illumination pattern in response to the ambient noise, based on the ambient beat and tempo.

8. An apparatus for displaying an illumination pattern comprising:
   a plurality of illumination regions capable of illumination of a plurality of colors and illuminated for at least one frequency;
   a processor operably coupled to each of the plurality of illumination regions, the processor capable of executing an illumination pattern in response to a device activity, wherein the illumination pattern includes the selective activation and deactivation according to illumination timing of the plurality of illumination regions.

9. The apparatus of claim 8 wherein the plurality of illumination regions includes a display region, a perimeter region, a keypad region and a navigation region.

10. The apparatus of claim 9 wherein the plurality of illumination regions includes further pluralities of illumination sub-regions.

11. The apparatus of claim 8 wherein at least one of the illumination regions includes at least one of: one or more light emitting diodes and a light channel.

12. The apparatus of claim 8 further comprising:
    a receiver capable of receiving an incoming signal having the illumination pattern associated therewith, such that the processor executes the illumination pattern in response to the reception of the incoming signal.

13. The apparatus of claim 12 wherein the incoming signal is transmitted using at least one of: a short messaging system, an extended messaging system and a multi-media messaging system.

14. The apparatus of claim 8 wherein the processor is disposed within a portable device and the activation of the illumination pattern occurs in response to at least one of: a caller identifier, an alarm and message transmitter identifier.

15. The apparatus of claim 8 further comprising:
a comparator capable of comparing a type of activation command with a database of illumination patterns and providing for the processor to activate a selected illumination pattern in response to the type of activation command.

16. The apparatus of claim 8 further comprising:
an ambient noise receiver capable of receiving ambient noise having a distinct rhythm includes a beat and tempo such that the processor generates an ambient illumination pattern in response to the ambient noise, based on the ambient beat and tempo.

17. A method for displaying an illumination pattern comprising:
reading an illumination pattern; and
in response to the illumination pattern and a portable device activity, activating at least one of a plurality illumination regions at a first frequency and a first color, and activating at least one of the plurality of illumination regions at a second frequency and a second color.

18. The method of claim 17 further comprising:
prior to reading the illumination pattern, receiving an incoming signal having at least one of: an illumination pattern identifier and the illumination pattern.

19. The method of claim 18 wherein the illumination pattern identifier includes at least one of: a caller identifier, a message transmitter identifier, an alarm and an ambient noise having a beat and tempo.

20. The method of claim 17 further comprising:
prior to reading the illumination pattern;
receiving the illumination pattern from a communication server;
storing the illumination pattern in a memory; and
providing for the association of the illumination pattern with an activity.

21. A method for causing an illumination pattern to be displayed, the method comprising:
receiving a first input signal to select an illumination pattern;
receiving a second input signal to select a recipient portable device capable of displaying the illumination pattern; and
transmitting the illumination pattern to the recipient portable device such that the recipient portable device displays the illumination pattern.

22. The method of claim 21 further comprising:
receiving at least one message input signal to generate an electronic message;
associating the illumination pattern with the electronic message; and
transmitting the electronic message, in conjunction with the illumination pattern to the recipient portable device.

23. The method of claim 22 wherein the electronic message is generated utilizing at least one of: a short messaging system, an extended messaging system and a multi-media messaging system.

24. The method of claim 21 wherein the illumination pattern includes at least one of the following: an illumination pattern source code, an illumination pattern key, a universal resource locator and an illumination pattern identifier.

25. The method of claim 21 wherein the illumination pattern may be stored and transmitted from a portable device.

26. The method of claim 21 wherein the illumination pattern is displayed by the recipient device to represent an emotion.

* * * * *